United States Patent [19]

Moates

[11] 4,385,361
[45] May 24, 1983

[54] GRAPHICS PRODUCED BY OPTICALLY SCANNING A DESIGN MODEL

[75] Inventor: Fred H. Moates, Helena, Ala.

[73] Assignee: The Rust Engineering Company, Birmingham, Ala.

[21] Appl. No.: 210,311

[22] Filed: Nov. 25, 1980

[51] Int. Cl.³ .............................................. G06F 15/56
[52] U.S. Cl. .................................. 364/520; 364/900; 382/8
[58] Field of Search ............... 364/515, 520, 200, 900, 364/300; 235/472; 340/146.3 ED, 146.3 SY

[56] References Cited

U.S. PATENT DOCUMENTS

| | | | |
|---|---|---|---|
| 2,980,319 | 4/1961 | Clemens et al. | 234/30 |
| 3,074,634 | 1/1963 | Gamo | 364/513 |
| 3,106,706 | 10/1963 | Kolanowski et al. | 340/345 |
| 3,126,635 | 3/1964 | Muldoon et al. | 33/18 |
| 3,391,392 | 7/1968 | Doyle | 364/900 |
| 3,519,997 | 7/1970 | Bernhart et al. | 364/300 |
| 3,636,328 | 1/1972 | Korelitz et al. | 364/512 |
| 3,735,350 | 5/1973 | Lemelson | 340/146.3 SY |
| 3,744,026 | 7/1973 | Wolff | 250/219 D X |
| 3,916,386 | 10/1975 | Teixeria et al. | 364/900 |
| 3,918,029 | 11/1975 | Lemelson | 340/146.3 SY |
| 3,930,237 | 12/1975 | Villers | 364/300 X |
| 4,058,849 | 11/1977 | Fitzgerald et al. | 364/300 X |
| 4,118,687 | 10/1978 | McWaters et al. | 340/146.3 ED |
| 4,158,194 | 6/1979 | McWaters et al. | 340/146.3 SY |
| 4,181,954 | 1/1980 | Rosenthal et al. | 364/520 |

OTHER PUBLICATIONS

Better and Faster Design by Machine, L. S. Gomolak, Electronics; Jun. 1, 1964 pp. 64–71.

Primary Examiner—Edward J. Wise
Attorney, Agent, or Firm—Schuyler, Banner, Birch, McKie & Beckett

[57] ABSTRACT

Graphics such as isometric engineering drawings needed for piping fabrication and installation in the construction of an industrial plant are generated by building a physical miniaturized design model of the plant, applying visually exposed indicia to separate segments on the model with this indicia for each segment being identifiably descriptive of the distinguishing characteristics of such segment as it is to exist in the final industrial plant after its construction, and optically scanning the exposed indicia on the design model to thereby collectively record the scanned information on an electronic storage memory. The recorded information is then integrated by utilizing a general purpose computer with a compatible computer program and the combined result is supplied as electronic plotting signals to a graphics plotter to produce the graphics for use thereafter in construction of the full size industrial plant.

11 Claims, 2 Drawing Figures

GRAPHICS PRODUCED BY OPTICALLY SCANNING A DESIGN MODEL

BACKGROUND OF THE INVENTION

This invention relates generally to a method of generating graphics such as the drawings and the data thereon needed for construction of an industrial plant or like project. More specifically, it is involved with the utilization of a general purpose computer employing optically scanned information taken from a design model in the generation of isometric engineering drawings as are needed for piping fabrication and installation in the construction of an industrial plant.

The fabrication and eventual installation of piping systems utilized in processing plants or similar projects involve a very substantial design effort and constitute a major part of the plant cost. Making isometric engineering drawings for such piping systems can not only be difficult but usually requires a great deal of skilled effort. In large oil refineries or chemical plants the design effort for the piping system alone can involve a matter of one third of the total design effort necessary to complete the final plant construction. Frequently, the piping system for such projects will be the last to be completed since the design of large fluid handling vessels must be finalized before locations for the piping and associated equipment can be precisely determined.

Large scale industrial processing plants require substantial quantities of piping, valves, fittings and associated components. These items are required in many different sizes, pressure ratings, materials of construction, end connections and other special features since for each class of service the correct selection of associated piping equipment must be made. For example, in a processing plant piping system, the handling of fluids at high pressure, the handling of high corrosive fluids at different pressures and temperatures plus handling steam, water etc. all add to the complexities required to be considered in design, fabrication and final installation in the completed industrial plant.

Pipe line systems for the industrial plant must be carefully dimensioned on isometric engineering drawings so that after fabrication in a welding shop, possibly remote from the plant location, they can be assembled in the field at the plant location and meet rigid and strict space tolerances. Obviously, to bend or stretch a section of large diameter welded pipe after fabrication to fit it into place is not a realistic possibility.

The isometric engineering drawings needed for piping fabrication and installation in the construction of an industrial plant should advantageously also identify the sizes, quantity, specifications, characteristics, etc. of hundreds of different piping items. These items must be ordered early in the design period to ensure that they will be available at the job site when needed. Frequently, erection of the piping system is a controlling factor in the construction schedule. Hence, missing materials or items can adversely affect the completion date for the entire plant project.

The graphics, such as isometric engineering drawings, needed for construction of an industrial plant have been produced under the teachings of the prior art with the aid of general purpose computing apparatus supplying electronic signals to a graphics plotter to produce the graphics. The input to such a general computer facilitates the computer selecting and dimensionally calculating, to correct scale, associated piping and equipment by utilization of only a minimum input of coded data presented to the computer. For example, Rosenthal et al U.S. Pat. No. 4,181,954 of Jan. 1, 1980 discloses a prior art computer aided graphics system.

Under the teachings of this Rosenthal et al patent an originator/designer must study all available two dimensional layouts, drawings and three dimensional models of the pipeline to be described. He then must mentally translate what he studies to manually encode the data that he has assembled onto a data sheet in a predetermined selected format. Then additional personnel are required, in the form of keypunch operators, who must keypunch the data from this data sheet into a binary code format on a deck of punched cards. This card deck is then combined with a computer program deck of cards, this latter deck being read into the computer in accordance with commands from a central control.

Through operation of the general purpose computer under the teachings of the Rosenthal et al patent, control signals are generated for manipulating the input data coming from the card deck manually produced by the keypunch operators. The general purpose computer then records its output onto a magnetic tape which supplies electronic plotting signals to a cathode ray tube plotter. This type of plotter converts the plotting tape signals into lines and letters, and records the information into microfilm at high speed. Visual enlargement from this microfilm product is carried out to complete isometric engineering drawings on paper vellum. These enlargements will portray the actual isometric drawings with a list of materials, notes, references, titles and other data on one portion of these drawings.

Although the procedures suggested in the above mentioned Rosenthal et al patent are advantageous in the generation of graphics such as isometric engineering drawings needed for piping fabrication and installation in the construction of an industrial plant project, they do necessitate the originator/designer to analyze and mentally transpose onto a coded data sheet the layouts, studies, models, etc., as the input information which he has to code onto the sheet. Then further personnel are required to take this multiplicity of data sheets and operate keypunch machines to punch the data from the sheets onto computer punch cards which, as a complete deck, reflect the data from the multitude of sheets produced by the originator/designer. Then this deck of hundreds of loose cards is supplied to a general purpose computer for integration with a compatible computer system program whereupon electronic plotting signals are supplied to a graphics plotter to produce the graphics to be used in construction of the full size industrial plant.

SUMMARY OF THE INVENTION

It is a principal object of the present invention to provide an improved method for generating graphics where the information to generate the graphics is accumulated by optically scanning exposed indicia displayed on a physical miniaturized design model of the project to be finally constructed.

An important object of the invention is to generate engineering graphics by a simplified method involving building a physical miniaturized design model of the project that is to be constructed, applying visually exposed indicia to separates segments on the model to represent distinguishing characteristics of that segment and optically scanning this exposed indicia to thereby collectively record the scanned information on an electronic storage memory which can be utilized through a general purpose computer and computer program to supply electronic plotting signals to a graphics plotter by which the graphics are produced.

A further object of the invention involves the utilization of a portable recorder that is provided with optically responsive indicia scanning means to facilitate, in accordance with the above objects, optically scanning and collectively recording the scanned information onto an electronic storage memory.

DETAILED DESCRIPTION OF THE DRAWING

The present invention will become more apparent from the following detailed description of an embodiment thereof taken in conjunction with the following described drawing which forms a part of this application.

DETAILED DESCRIPTION OF AN EMBODIMENT OF THE INVENTION

Figure 1:
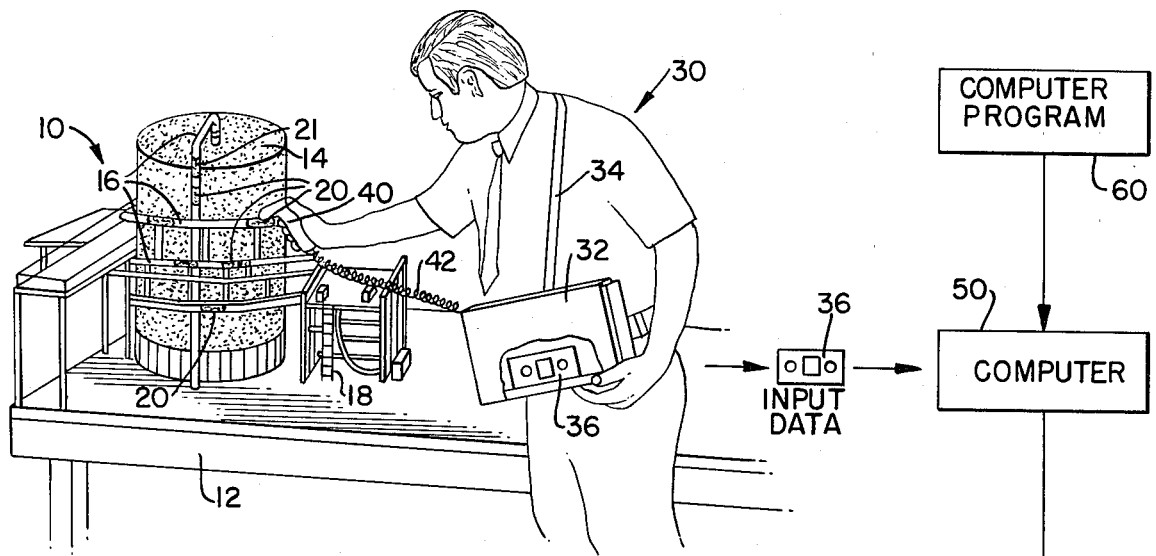
FIG. 1 is a schematic pictorial and block diagram of the graphics generating system of the present invention.

FIG. 1 pictorially illustrates a portion of a miniaturized design model 10 suitably supported on a model table 12. Of course, the miniaturized design model portion at the upper left hand corner of FIG. 1 only exemplifies a very limited portion of an industrial plant or like project which is eventually to be constructed at the plant location in its full size. Indeed, the miniaturized design model for a typical pulp and paper plant that was constructed and utilized in accordance with the invention herein, required over one hundred large model tables for its support.

Figure 2:
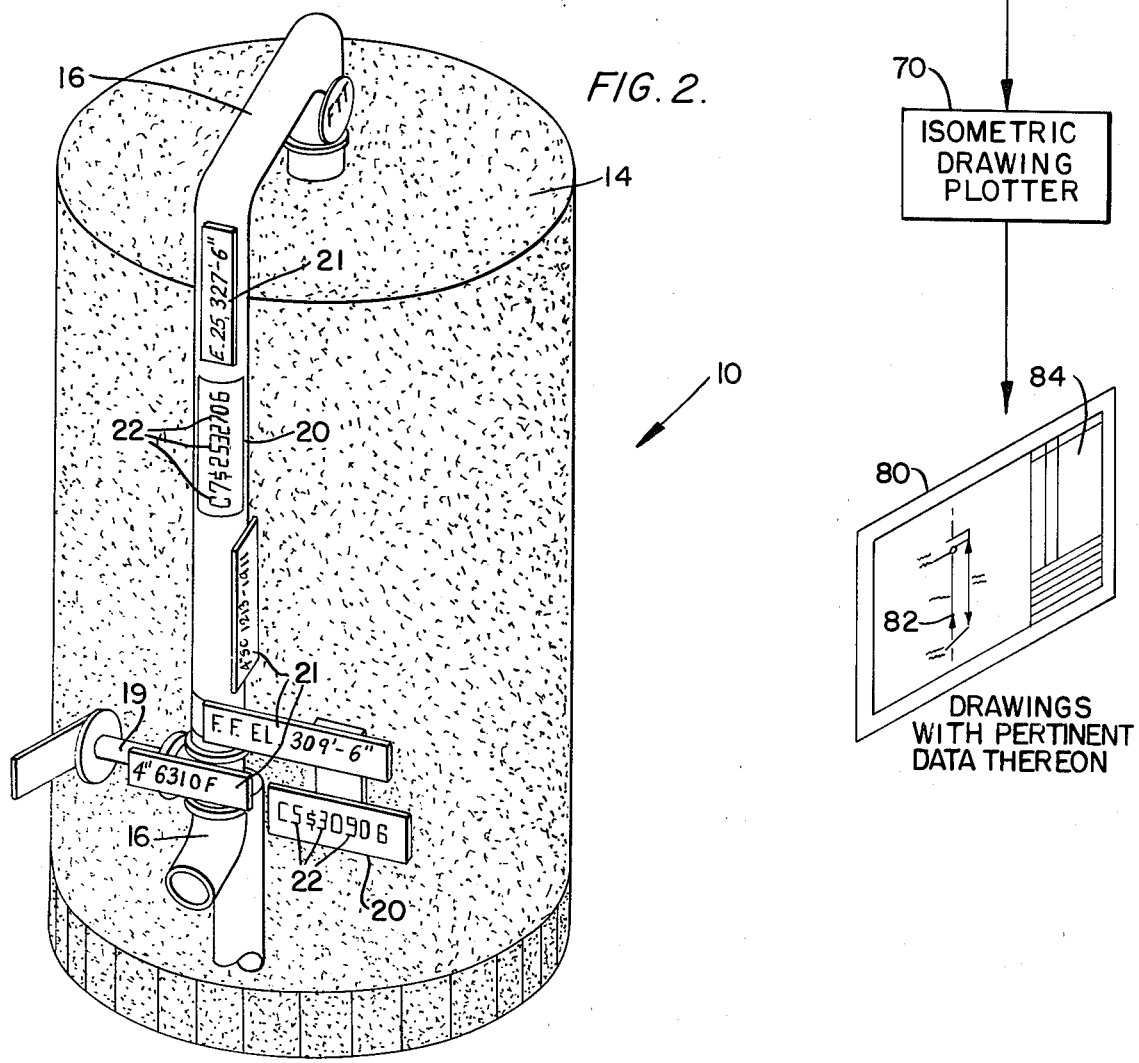
FIG. 2 is an enlarged illustration of a portion of a design model provided with individual labels and tags displaying indicia representative of a segment of the project that is to be constructed.

Merely by way of exemplification as to several components which may be visualized as being shown by the portion of model 10 appearing on FIG. 1 and the enlarged portion of FIG. 2, a large upstanding vessel 14 could be a pulp digester and the parts 16 of the model 10 might well be piping lines associated with vessel 14 to function in accordance with an overall purpose in operation of the industrial plant when it is constructed. The exact finalized details in the miniaturized design model 10, even such as ladder 18, valve 19, etc., are included so that the completed physical design model will actually and accurately depict the final industrial plant or like project that is to be constructed. Merely by way of example, the model may be constructed to a scale of three-quarters of an inch per foot with an accuracy tolerance of plus or minus 1/16th of an inch.

Thus the total design model 10 physically illustrates and represents all mechanical, structural, architectural, piping, heating, ventilating, electrical, instrumentation, etc. features exactly as they are to exist in the final plant construction. In constructing the physical miniaturized design model, the piping designers place the necessary pipe lines physically and accurately in place on the model, mechanical designers arrange equipment such as pumps and other components in place on the model, and structural engineers utilize the physical model for arrangement of structural steel and concrete design.

Once the physical miniaturized design model 10 has been completed, the separately distinguishable segments of piping lines, pressure vessels, pumps, valves, etc., are individually tagged. For example, considering a piping line as one separate segment, it is to be tagged for such characteristics as center line elevations and coordinates, valve and appurtenance locations, dimensional take-out, in-line instrumentation and terminals.

The desired tagging of the design model 10 may conveniently be carried out by applying individual labels 20 and, to the extent desired, tags 21 for each separately identifiable segment on the model 10. The enlarged illustration of a representative portion of the design model as shown on FIG. 2 has several typical labels 20 appropriately positioned thereon. Each of these labels displays code language indicia 22 which, when label 20 is affixed to the segment on model 10 to which it relates will identifiably describe, in appropriately adopted computer code language, the distinguishing characteristics for that segment of the project that such segment is to have in the final construction of the full size industrial plant project.

Although not essential to the graphics production invention of this application, tags 21 may also be beneficially affixed to the separately identifiable segments on the model 10. The tags 21 will display on the model visually observable information in engineering language rather than in the computer code language represented by the exposed indicia 22 on labels 20. The information displayed on tags 21 will generally be helpful to persons working with the model to facilitate their recognizing the engineering designation for the components, their location, characteristics, etc. Thus these persons need not undertake translation of the code language displayed on labels 20 in the form of indicia 22, but rather can gain an immediate understanding of the structural portion involved from the information that is contained on the tags 21.

With the tagging of the miniaturized design model 10 completed by affixing the individual labels 20 and tags 21 to the various separate segments on the model, the code language indicia 22 on each label 20 is visually exposed in the manner as shown on the upper left hand corner of FIG. 1 and on the enlarged model portion of FIG. 2. This visually exposed indicia on the labels 20 is then optically scanned to collect the information reflected by the code language context of such exposed indicia. As previously mentioned, the indicia for each segment, although in appropriately selected computer code language, is identifiably descriptive of the distinguishing characteristics that such segment is to have in the final construction of the industrial plant or like project.

Advantageously, the optical scanning of the exposed indicia on labels 20 that have been affixed to the proper segments of the model 10 is performed by an operator 30 who is provided with a portable recorder 32. Ideally a light weight recording apparatus which may be easily supported by a shoulder strap 34 on the operator 30 will be utilized to provide recorder 32. The scanned information that is collected and recorded from the indicia 22 on labels 20 is collected onto a electronic storage memory. In portable recorder 32 this memory means may conveniently be provided by a tape cassette 36 which will provide the magnetic recording tape for the memory storage function of recorder 32.

The portable recorder 32 is provided with a hand held scanning wand 40 that is electrically connected by wire 42 to transmit scanned information from wand 40 into recorder 32 where it is electronically stored, by known techniques, in the memory provided by tape cassette 36. Thus, to collect the visually exposed indicia 22 from the labels 20, the operator 30 optically scans the exposed indicia by moving the hand held scanning wand 40 across the indicia on each of the labels 20 in succession, these labels already having been affixed to their proper segment of the design model 10. This scanned information is transmitted through wire 42 to recorder 32 where it is collected onto the electronic storage memory provided by tape cassette 36.

To collectively record the information scanned by wand 40 from labels 20 in the recorder 32 on cassette 36, the use of optically reflective procedures are preferred. These procedures use optical character recognition equipment where light reflection from the indicia 22 on labels 20 gives the optical character recognition (OCR) to permit effective utilization of the design model 10. A unit that reads and records coded data such as displayed on labels 20 is available from Recognition Equipment Incorporated of Dallas, Tex. Such unit has been found effective for optically scanning and collectively recording the scanned information as needed to produce the input data on tape cassette 36 for carrying out this invention.

Once the scanned information has been collectively recorded on the storage memory of tape cassette 36, this stored information on cassette 36 is taken from recorder 32 by physically removing the cassette and then utilizing the tape cassette with the magnetic recording tape contained therein as input data supplied to a general purpose computer 50.

The input data, now stored in tape cassette 36, is appropriately combined by known computer techniques with a compatible computer system program 60. Of course, the program language will be chosen to be compatible with the code language of indicia 22 recorded onto tape cassette 36. The integrated output from general purpose computer 50 is appropriately supplied in the form of electronic plotting signals to a graphics plotter 70. The graphics plotter 70 makes use of these plotting signals to produce the graphics 80. These graphics are in the form of isometric engineering drawings which also individually display pertinent data relating to the isometric drawing portion on each of the graphics 80. These graphics 80 collectively are thereafter available to be used in the actual construction of the full sized project, be it an industrial plant or otherwise.

Each of graphics 80 produced by plotter 70 will preferably display an isometric drawing portion 82 and a printed data portion 84. The data portion 84 includes such items as a list of materials, notes, references, titles and other data. In any event, the generated graphics 80 produced from plotter 70 are assembled and thereafter useable for on-site cnstruction of the full sized industrial plant which they represent.

Solely for purposes of illustration, the concepts disclosed for utilization of input data in Rosenthal et al patent 4,181,954 of Jan. 1, 1980 may be considered as illustrative of appropriate techniques that can be followed in utilization of the input data collected on the magnetic tape of tape cassette 36 in carrying out this invention.

In actual application, the invention has been employed with a physical miniaturized design model where a hand held wand 40 coupled to a recorder 32 optically scans and records data from labels 20 attached to various components as well as from various prepared "menus". These "menus" set forth the interrelationship between the engineering language terms known to designate a particular component, the indicia 22 code language used on labels 20 and the computer language of program 60. This recorded data, in practice, has been transferred to a Texas Instruments 763 "bubble memory" terminal by means of which it was transmitted over a telephone line to a centrally located general purpose computer. The computer executed a computer program compatible with the recorded data from cassette 36 and thereupon the computer output signals were transmitted over the telephone line back to a Versatec plotter which produced the final isometric graphics. The Versatec plotter used had a capability of generating six to eight isometric drawings per minute. The isometric drawings as plotted, were 11 inches by 17 inches containing roughly 40 linear feet of pipeline with an associated bill of materials displayed on each drawing.

It will of course be understood that many different general purpose computers may be employed in utilizing the recorded information that is collected by optically scanning the exposed indicia 22 displayed by the labels 20 affixed to segments on the design model. Also, a variety of different graphics plotters are available which may be employed in conjunction with carrying out the invention to plot the graphics 80 with its isometric drawing portion 82 and its printed data portion 84.

While a preferred embodiment has been shown and described, it will apparent to those skilled in the art that changes can be made in execution of the embodiment disclosed without departing from the principles and spirit of the invention, the scope of which is defined in the appended claims. For example, within the broader aspects of the invention, a variety of general purpose digital computers could be programmed to perform the data processing operations in response to the recorded data from the visually exposed indicia 22 on labels 20 collected through scanning wand 40. Accordingly, the foregoing embodiment is considered illustrative, rather than restrictive, and those modifications which come within the meaning and range of equivalents of the claims are to be included therein.

I claim:

1. A method of generating graphics such as isometric drawings for construction of a full size industrial plant or like project comprising:

building a physical three dimensional miniaturized design model of the full size project that is to be constructed;

applying visually exposed indicia to each of a plurality of separate segments on the model, said indicia for each segment being identifiably descriptive of the distinguishing characteristics that the segment represents on the physical model and is to have in the final construction of the full size project;

optically scanning the exposed indicia on each of said separate segments of the model;

collectively recording the scanned information onto electronic storage memory means; and utilizing the recorded information in conjunction with a compatible computer system program and general purpose computer to supply electronic plotting signals to a graphics plotter which produces the graphics for use thereafter in construction of the full size porject.

2. A method of generating graphics are recited in claim 1 wherein applying the indicia includes preparing individual label means for each said separate segment with the indicia on each said individual label means being indicative of the distinguishing characteristics for a particular segment of the physical model and corresponding particular segment of the full size project, and affixing each said label means to its particular segment on said model.

3. A method of generating graphics as recited in claim 1 wherein said indicia for each segment includes identification of part location, size, part specifications and other specifics that identifiably describe the make up of the particular segment of the physical model to which the indicia is applied and make up for the corresponding particular segment of the full size project.

4. A method of generating graphics as recited in any one of claims 1, 2 or 3 wherein said scanning and said recording are performed by employing portable recording means provided with optically responsive indicia scanning means.

5. A method of generating graphics as recited in claim 4 wherein said scanning means includes a hand held scanning wand movable across the indicia during scanning.

6. A method of generating graphics as recited in claim 4 wherein said portable recording means comprises a recorder having means to support it by being carried on the body of a user, and said scanning means includes a hand held scanning wand electrically connected to transmit scanned information to be recorded by said recorder.

7. A method of generating graphics as recited in claim 4 wherein said recording means includes a magnetic recording tape on which the scanned information is recorded as transmitted thereto from said indicia scanning means.

8. A method of generating graphics as recited in any one of claims 1, 2 or 3 wherein said utilizing of the recorded information includes transferring the electronic storage memory means to form input data to a program directed general purpose computer, and supplying the computer output signals to a graphics plotter.

9. A method of generating graphics as recited in claim 8 wherein said scanning and said recording are performed by employing portable recording means provided with optically responsive indicia scanning means.

10. A method for generating graphics as recited in claim 9 wherein said scanning means includes a hand held scanning wand movable across the indicia during scanning.

11. A method of generating graphics such as isometric drawings for construction of a full size industrial plant or like project comprising:

building a physical three dimensional miniaturized design model of the full size project that is to be constructed;

applying visually exposed indicia to each of a plurality of separate segments on the model by preparing individual label means for each said separate segment with the indicia on each said individual label means being identifiably descriptive of the distinguishing characteristics for a particular segment of the physical model and corresponding particular segment of the full size project, and affixing each said label means to its particular segment on said model;

optically scanning said exposed indicia on each said label means on said model; and collectively recording the scanned information onto electronic storage memory means for utilization in conjunction with a compatible computer system program and general purpose computer to supply electronic plotting signals to a graphics plotter which produces the graphics for use thereafter in construction of the full size project.

* * * * *